UNITED STATES PATENT OFFICE.

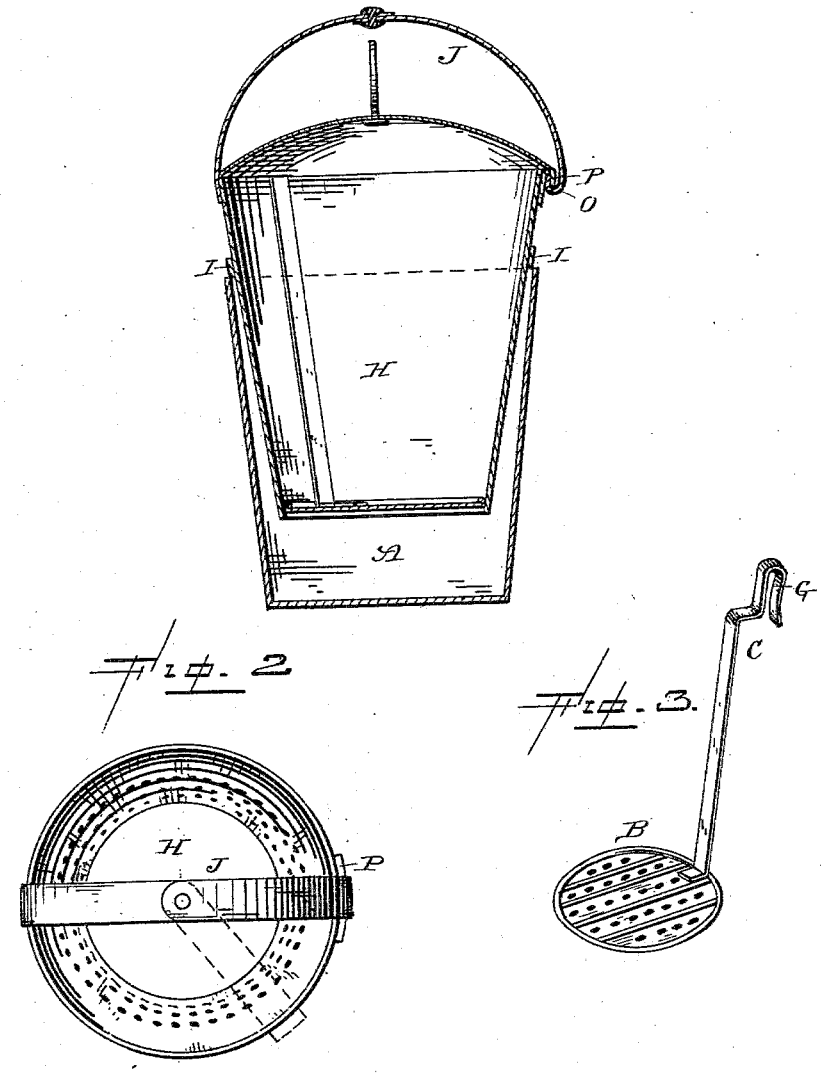

JOHN EYER, JR., OF MORRILL, KANSAS.

COOKING UTENSIL.

SPECIFICATION forming part of Letters Patent No. 281,042, dated July 10, 1883.

Application filed May 14, 1883. (No model.)

*To all whom it may concern:*

Be it known that I, JOHN EYER, Jr., of Morrill, in the county of Brown and State of Kansas, have invented certain new and useful Improvements in Cooking Utensils; and I do hereby declare the following to be a full, clear, and exact description of the invention, such as will enable others skilled in the art to which it pertains to make and use it, reference being had to the accompanying drawings, which form part of this specification.

My invention relates to an improvement in cooking utensils; and it consists in the combination of a perforated bottomless steaming-vessel which is to be placed inside of the pot or other vessel containing boiling water, with its handle, which is made in two parts, the pivoted portion of which can be swung around at an angle so as to allow a perforated bottom to be readily removed from and replaced therein, all of which will be more fully described hereinafter.

The object of my invention is to provide both a means for preventing articles which are being boiled from being burned in case the water should boil away, and to form a device which can be placed in a pot for the purpose of cooking articles by steam or steaming those which have already been cooked.

Figure 1 is a vertical section of my invention, showing the steamer placed inside of an ordinary pot. Fig. 2 is a plan view of the perforated bottomless steamer. Fig. 3 is a perspective of the perforated plate provided with a handle.

A represents an ordinary pot of the usual description, above the bottom of which is to be placed the perforated plate B, provided with a handle, C, while potatoes or other articles are being boiled. In case the water should boil away, the potatoes, instead of resting upon the bottom of the pot, will rest upon this perforated plate, and as this perforated plate will not rest directly upon the bottom of the pot, it will readily be seen that the potatoes or other articles cannot become burned. In order to prevent this perforated plate from resting directly upon the bottom of the pot, the handle is provided with a bend or crook, G, which catches over the edge of the pot, and thus prevents it from sinking too low down. After articles have been boiled and it is desired to keep them hot by steaming them, a perforated bottomless cylinder or vessel, H, is provided, which fits inside of the pot, and which may have a band or rim, I, formed around its side, so as to form a tolerably tight joint with the top of the pot. This tight joint will prevent the steam from escaping from the top and will force the steam to rise through the perforations in the cylinder. While the cylinder is being used the perforated plate provided with a handle is placed in the cylinder, so as to form a bottom upon which the article of food will be placed. The hook formed in the handle will then catch over the top edge of the cylinder, as shown, and prevent the perforated plate from sinking down too far or being forced through in case too heavy a weight is placed upon it.

In order to allow the perforated plate to be readily inserted in and removed from the perforated cylinder, the handle J is made in two parts, one of which is pivoted to the other, and has its end bent at right angles, as shown at O, so as to catch under a flange, P, which is formed upon one side of the cylinder. The other portion of the handle will be pivoted to the side of the cylinder in the usual manner. In lifting out the cylinder the bent end of the pivoted part will be made to catch under the flange; but when the perforated plate is to be lifted out, and especially when it has something resting upon its top, this pivoted portion of the handle will be turned back out of the way, so as to allow the plate to be freely removed and restored to place.

Having thus described my invention, I claim—

1. The combination of the perforated cylinder with the handle, which is formed in two parts, one of the parts of the handle being adapted to be turned out of the way, substantially as set forth.

2. The combination of a cooking utensil, a handle which is made in two parts, one of the parts having its end bent and adapted to catch under a flange formed on the side of the utensil, substantially as described.

3. The combination of a pot, a perforated cylinder, and a perforated plate provided with a handle, the handle being provided with a bend, so as to catch over the top of the pot or cylinder, substantially as specified.

In testimony whereof I affix my signature in presence of two witnesses.

JOHN EYER, JR.

Witnesses:
 JAMES H. WATTS,
 P. K. FISHER.